Dec. 29, 1964     H. G. STENGER     3,163,693
APPARATUS FOR AND METHOD OF PLASTICIZING AND
DISPENSING PLASTIC MATERIAL
Filed June 29, 1962     4 Sheets-Sheet 2
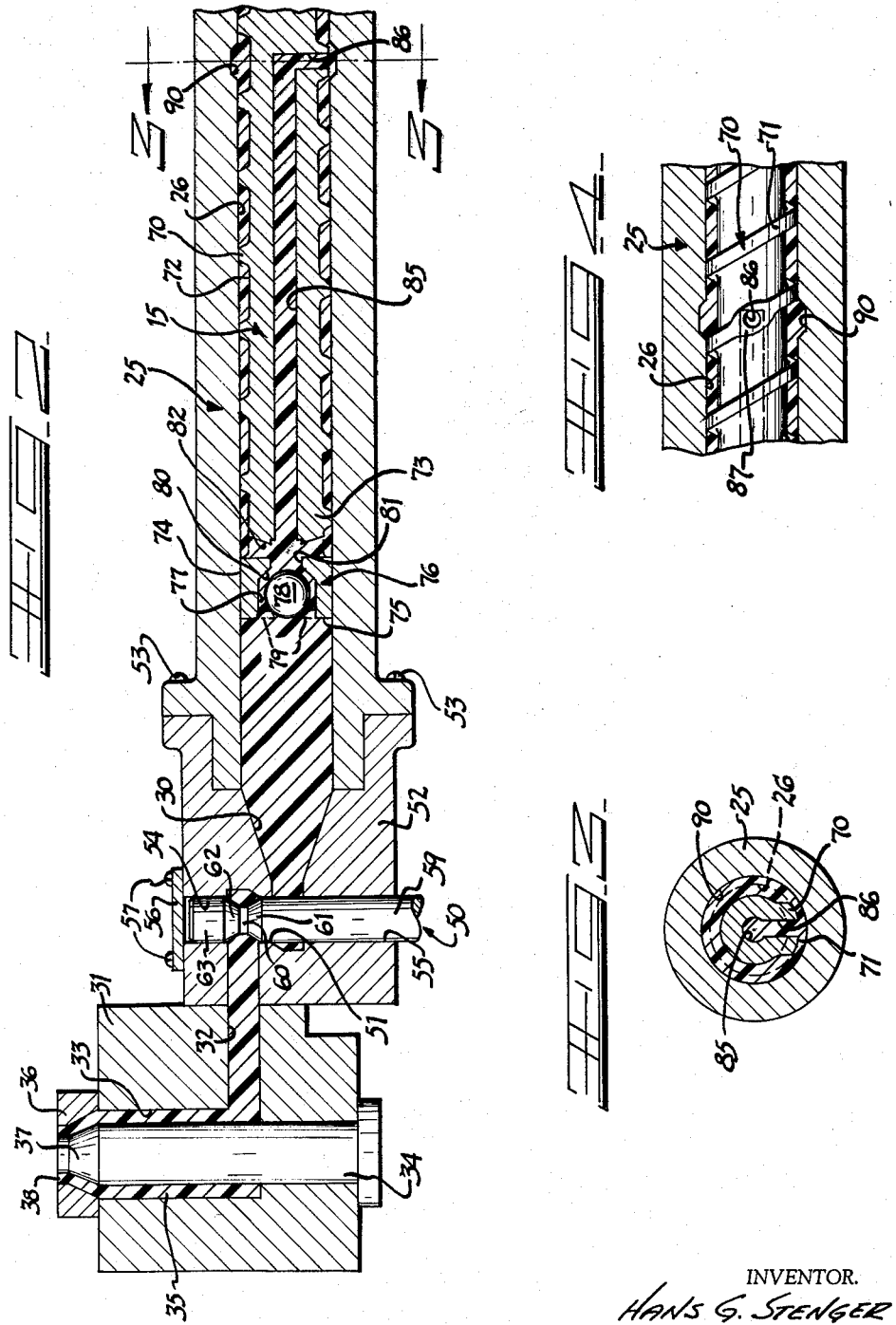
INVENTOR.
HANS G. STENGER
BY Spencer L. Blaylock, Jr.
W. A. Schaich
ATTORNEYS

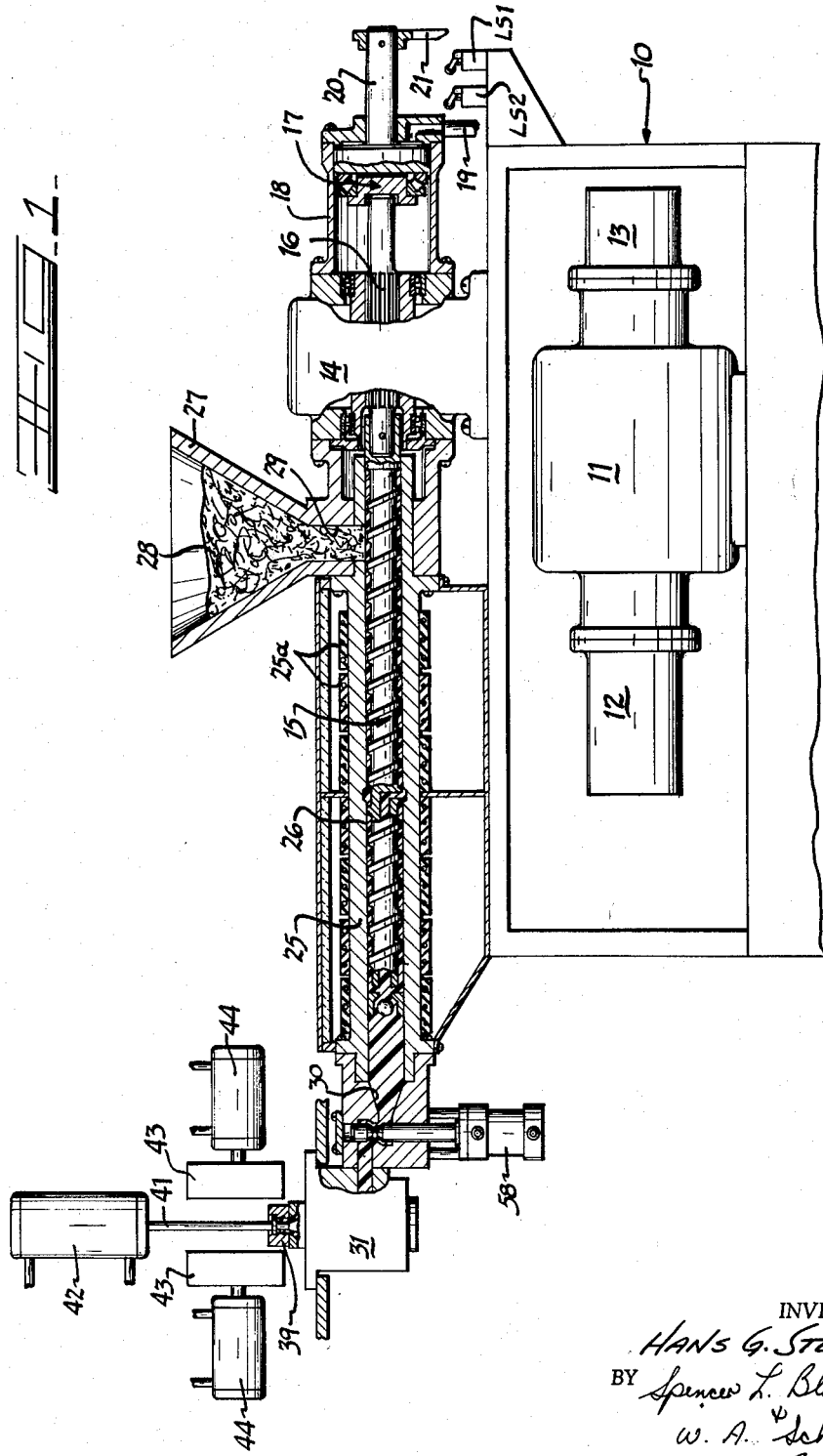

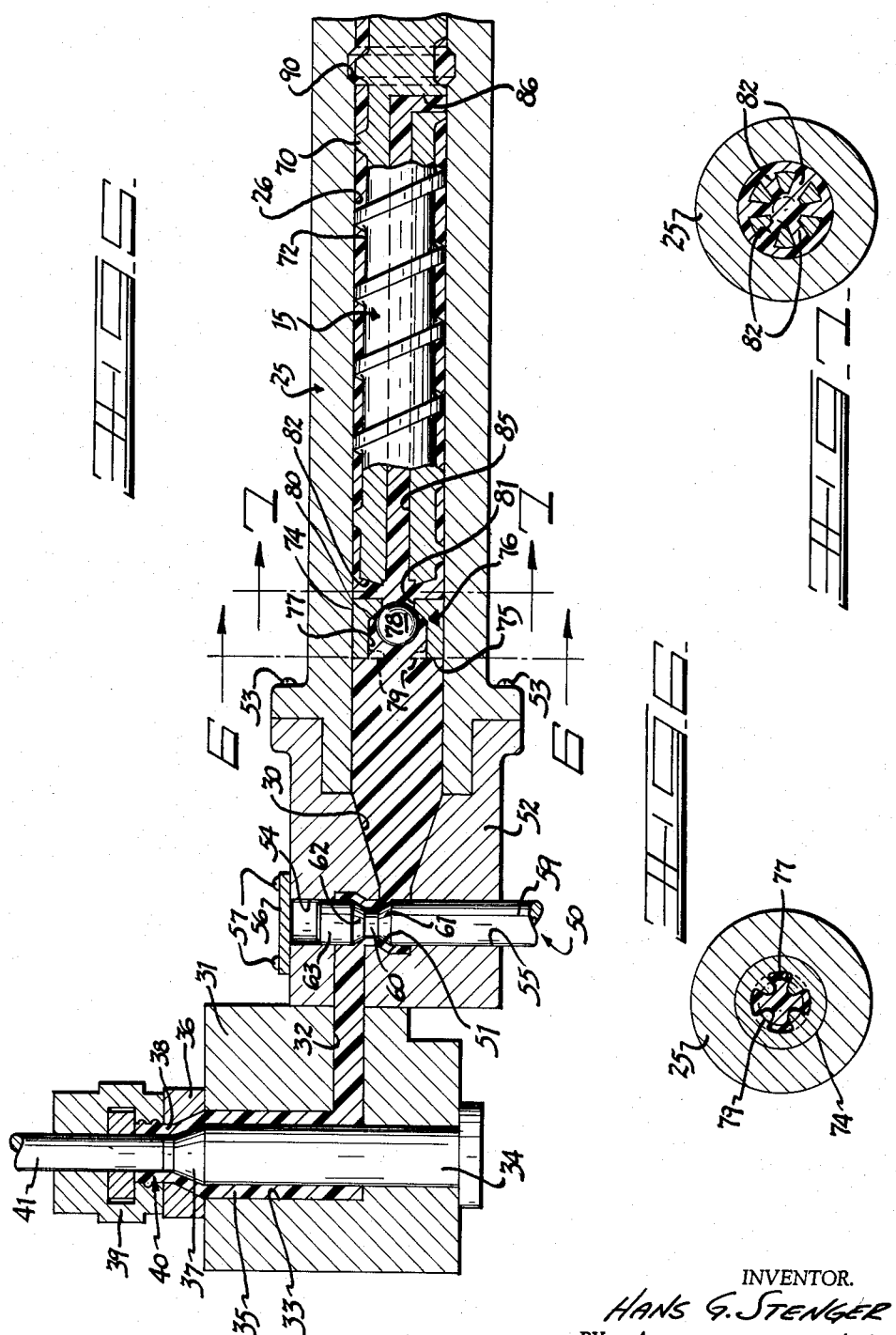

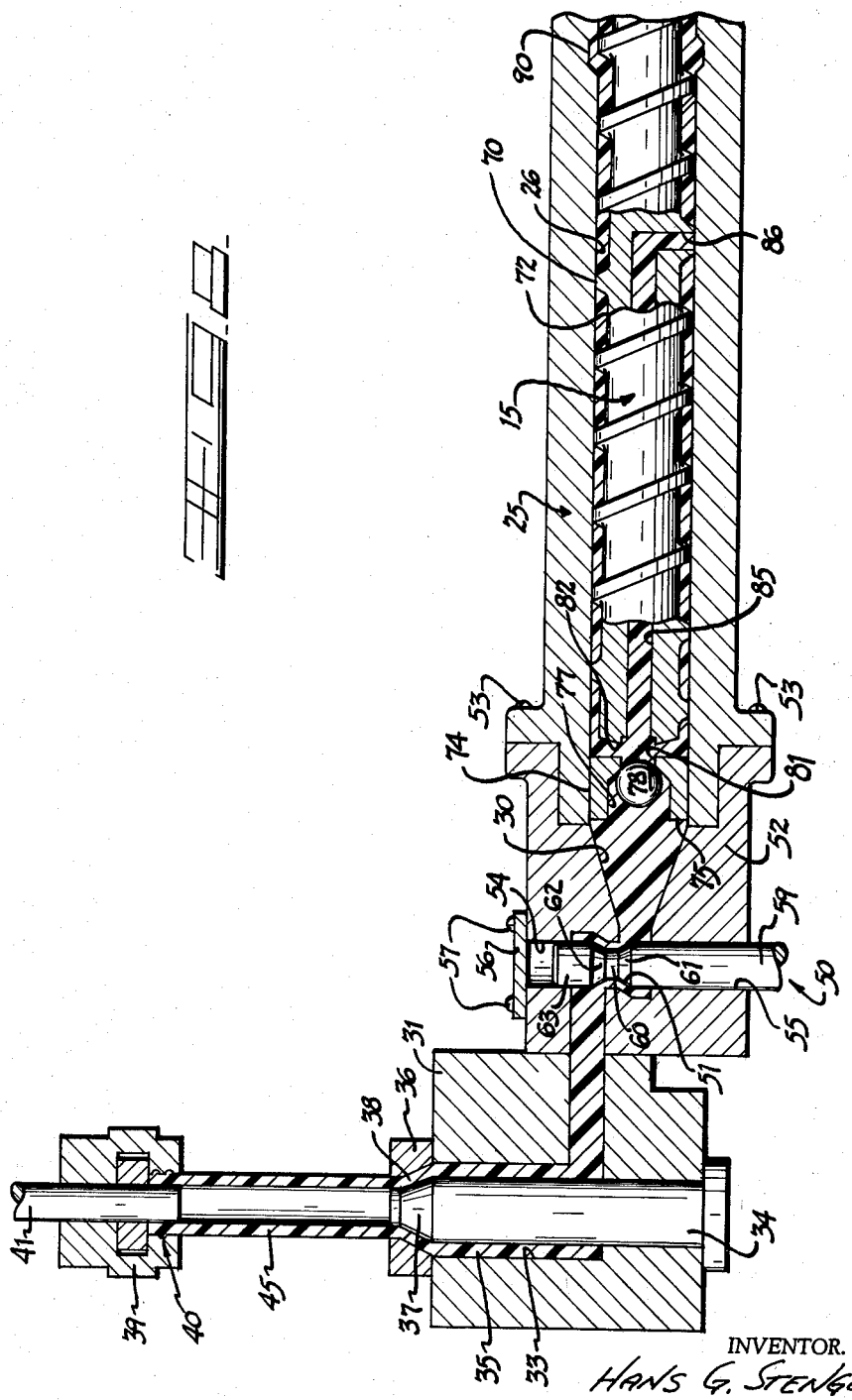

United States Patent Office 3,163,693
Patented Dec. 29, 1964

3,163,693
APPARATUS FOR AND METHOD OF PLASTICIZING AND DISPENSING PLASTIC MATERIAL
Hans G. Stenger, Lambertville, Mich., assignor to Owens-Illinois Glass Company, a corporation of Ohio
Filed June 29, 1962, Ser. No. 206,290
9 Claims. (Cl. 264—329)

The present invention relates to an apparatus for and method of plasticizing and dispensing plastic material. More particularly, the present invention relates to a method of and apparatus for recirculating plasticized material intermediate successive issues of such material from an axially displaceable, continuously rotatable screw-type plasticizer.

In the molding of plastic materials, there have recently been developed so-called "reciprocating screw" type machines utilized for both injection molding and extrusion operations and wherein a screw-plasticizer is axially displaced toward a dispensing orifice to eject material accumulated in advance of the screw. In one such type machine, the screw continuously rotates and is reciprocated in timed relation to the issuance of material through the orifice. These machines have not been satisfactory in use because of their relative inflexibility (due to the necessity of continuously reciprocating the screw in one direction or another) and because of the lack of control mechanisms sufficiently adaptable to permit utilization of the rotatable axially displaceable screw in variable forming sequences. Another type of machine utilizes a screw which is intermittently rotatable, as well as intermittently longitudinally displaceable. This type of machine operates well with some types of plastic materials, but the machine loses the desirable features residing in continuously rotating the screw, such advantages including a simplified, inertia-free screw drive, the inherent uniformity of continuous plasticizing action, and the elimination of control components necessary to intermittent rotation.

The present invention now proposes a novel type machine wherein the screw is continuously driven and yet can be adapted to any desired sequence of operation, thus obtaining all of the advantages of both types of machines previously described.

To accomplish this result, the plasticizer device of the instant invention is provided with an axially extending recess communicating with the exit end of the plasticizing section of the screw and communicating with the land of the screw intermediate the length of the screw. At one predetermined axial position of the screw, this recess communicates with an annular chamber formed in the plasticizer barrel, so that plasticized material discharged from the screw can flow through the axial recess to the periphery of the screw for return on the screw flights to the exit end thereof. Thus, material normally discharged by the screw will be recirculated and the screw may be rotated continuously in an effective "idling" position.

Preferably, the discharge end of the screw is provided with an enlarged, non-threaded piston end fitting snugly within the plasticizer barrel to present an effective piston head at the end of the screw for displacing material through a dispensing orifice as the screw is advanced toward the orifice. To accommodate the flow of plasticized material through this enlarged piston head, the piston head is axially bored and provided with a one-way check valve. This check valve accommodates the flow of plasticized material from the screw flights for accumulation between the screw and the dispensing orifice and yet prevents the reverse flow of plasticized and accumulated material along the flight of the screw or through the screw recirculation recess as the screw is advanced.

All in all, the present invention proposes a structure which is extremely simple in design, which accommodates continuous rotation of the screw with all the advantages thereof as heretofore summarized, and which provides for the efficient expression of plasticized material through a dispensing orifice for either injection molding or extrusion operations and without accommodating the back flow of plasticized material along the screw flights as the screw is advanced through its dispensing stroke. As a result of this simplified structure, and particularly due to the piston end and ball check arrangement at the discharge end of the screw, accurately metered charges of plasticized material are expressed through the orifice or other dispensing opening upon each reciprocation of the screw.

The method of the present invention is closely correlated with the structure heretofore described and includes the steps of accumulating a body of plasticized material to be subsequently dispensed through the orifice or other dispensing opening, recirculating material plasticized by the screw only after the body of accumulated material has been accumulated, and advancing the screw upon demand for accumulated material at the dispensing orifice to simultaneously interrupt the recirculation of plasticized material and dispense plasticized material through the orifice.

It is, therefore, an important object of the present invention to provide a new and improved apparatus for plasticizing and dispensing plastic material and utilizing a constantly rotatable, axially displaceable screw-type plasticizer capable of recirculating plasticized material once a body of such plasticized material has been accumulated.

Another important object of the present invention is the provision of an improved method of plasticizing and dispensing plastic material wherein a body of such material is accumulated for subsequent expression through a dispensing orifice, subsequently plasticized material is recirculated, and such recirculation is interrupted during dispensing of the previously accumulated material through the orifice.

It is a further object of this invention to provide an improved apparatus for plasticizing and dispensing plasticized material wherein a plasticizer screw is provided with an axial recirculation passage communicating at one end with the discharge end of the screw and communicating at its other end with a recess in the screw barrel accommodating recirculation of material internally of the screw to a medial portion of the screw flights.

Yet another, and no less important, object of the present invention is the provision of an improved plasticizing apparatus including a continuously rotatable, axially displaceable plasticizer screw provided with a cylindrical piston end for displacing material through a dispensing orifice upon axial displacement of the screw, the piston end being provided with a check valve accommodating the flow of plasticized material from the screw flights to a position in advance of the piston end, but preventing the reverse flow of plasticized material along the screw flights as the screw is axially displaced.

Other objects of this invention will appear in the following description and appended claims, reference being had to the accompanying drawings forming a part of this specification wherein like reference characters designate corresponding parts in the several views.

On the drawings:

FIGURE 1 is a side elevational view, with parts broken away and in section, of a plasticizing and molding apparatus utilizing the present invention.

FIGURE 2 is an enlarged vertical sectional view illustrating in greater detail a portion of the apparatus illustrated in FIGURE 1;

FIGURE 3 is a sectional view taken along the plane 3—3 of FIGURE 2;

FIGURE 4 is a fragmentary view similar to FIGURE 2, but illustrating the plasticizer screw in elevation;

FIGURE 5 is a view similar to FIGURE 2 illustrating an adjusted position of the plasticizer and dispensing screw;

FIGURE 6 is a sectional view taken along the plane 6—6 of FIGURE 5;

FIGURE 7 is a sectional view taken along the plane 7—7 of FIGURE 5; and

FIGURE 8 is another fragmentary view similar to FIGURE 2 and FIGURE 5 illustrating another adjusted position of the apparatus.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings:

The apparatus illustrated in FIGURES 1 through 8 of the drawings is generally similar to that disclosed in my earlier filed, copending application Serial No. 185,756, filed in the United States Patent Office on April 6, 1962, and assigned to the assignee of the present invention. The primary differences between the apparatus shown in said earlier filed application and that of the instant application reside in the fact that the plasticizer screw which I earlier disclosed was intermittently rotatable, whereas the plasticizer screw of the instant application is continuously rotatable. Such continuous rotation of the plasticizer screw herein disclosed is accommodated by recirculation of plasticized material discharged from the free or active end of the plasticizer screw.

*General Structure*

As illustrated in FIGURE 1 of the drawings, the basic plasticizer structure and its drive mechanism is substantially the same as those disclosed in my above-identified copending application Serial No. 185,756, this structure being adapted, as hereinafter explained, to continuously drive the extruder screw. The mechanism further is adapted to carry out a container-forming cycle substantially the same as that set forth in Patent No. 3,008,192, issued to the assignee of the present invention.

More specifically, the structure of FIGURE 1 includes a machine base and supporting frame 10 having mounted thereon a drive motor 11 connected in a suitable manner to drive pumps 12 and 13. This latter pump 13 is suitably connected to a hydraulic drive motor (not shown) to rotate the extruder screw by drive mechanism housed within a housing 14. This drive mechanism is described in detail in my above-identified application and need not be disclosed here. The pump 12 is utilized to provide a source of pressure for the various control elements, actuating pistons and the like disclosed generally in the above-identified patent and hereinafter disclosed in greater detail.

The extruder screw 15 is drivingly connected to a splined drive shaft 16 continuously rotated by the drive mechanism within the housing 14, this shaft being connected at its rear end to a hydraulic motor piston 17, this piston being disposed interiorly of a cylinder 18 receiving fluid under pressure from the pump 13 through a conduit 19, fluid under pressure through the conduit 19 displacing the screw shaft 16 and the screw 15 to the left from the illustrated position of FIGURE 1. The piston 17 is provided with a shaft extension 20 projecting beyond the cylinder 18 and bearing at its free rear end a fixed actuating arm 21 contactable with limit switches LS1 and LS2 as the screw 15 is displaced to the left by the piston 17.

The screw 15 is enclosed within a barrel 25 having a cylindrical bore 26 therethrough, this bore 26 communicating adjacent its rear end with an overhead supply hopper 27 filled with particulate or solid plastic material 28. The material drops through a delivery passage 29 into the bore 26 to be advanced therethrough by the screw 15 in a manner common to all such screwtype plasticizers.

The other end of the bore 26 communicates through a reduced passage 30 with a dispensing block 31. As best illustrated in FIGURE 2, this dispensing block 31 is provided with a first lateral passage 32 communicating with a vertical cylindrical passage 33 receiving concentrically therein a mandrel 34, the passage 33 and the mandrel 34 defining therebetween an annular flow path 35 for plasticized material. Superimposed upon the block 31 is an orifice plate 36 which cooperates with the tapered end 37 of the mandrel 34 to define an annular dispensing orifice 38.

As best shown in FIGURES 1 and 5, this annular dispensing orifice 38 is adapted to receive thereagainst a neck mold 39 having an internal cavity 40 in the shape of a container neck or the like.

The block 37 is preferably split in a plane lying normal to the plane of FIGURES 1 and 5 to open the neck mold cavity 40 for the removal of the contents at the conclusion of a forming cycle. The neck mold 39 surrounds a central core pin 41 projecting vertically beyond the neck mold 39 and having its lower end abuttable with the free upper end of the mandrel 34. As best illustrated in FIGURE 1 of the drawings, this core pin 41 forms the actuating rod of a fluid pressure cylinder 42, actuation of the cylinder 42 being effective to elevate the neck mold 39 from its lowered position of FIGURES 1 and 5 to its elevated position of FIGURE 8. Positioned to either side of the neck mold 39 to accommodate passage of the neck mold therebetween are a pair of blow mold sections 43 adapted to be actuated from their open positions of FIGURE 1 to a closed position (not shown) by individual fluid pressure actuated cylinders 44, respectively.

The device as illustrated in FIGURE 1 operates in accordance with the method set forth in the above-identified Patent 3,008,192 in that plasticized material from the plasticizer screw 15 is introduced through the passage 35 and from the orifice 38 to fill the neck mold 39 when the mold is positioned as illustrated in FIGURES 1 and 5 of the drawings. Thus, the cavity 40 forms an injection mold filled with material from the screw 15. Subsequently, the neck mold 39 is withdrawn vertically upwardly by means of the overhead cylinder 42 as additional material is dispensed through the orifice 38, this additional material being extruded as a tube 45 (FIGURE 8) integral with material filling the mold cavity 40 and integral with material filling the orifice 38. After the tube 45 has been extruded, the blow mold sections 43 are actuated to their closed positions upon the tube 45 and the tube is subsequently inflated through the core pin 41.

Closure of the blow mold sections pinches the tube 45 shut in closely spaced relation to the orifice 38 and inflation of the tube 45 interiorly of the closed blow mold sections 43 forms the body of a container having the contour of the blow mold cavities. Finally, the neck mold 39 is opened, the blown article is severed from the orifice 38, and the completed article is removed from the apparatus. The cylinder 42 is actuated to again lower the neck mold 39 to its position of FIGURES 1 and 5 to initiate the next subsequent forming cycle.

The flow of material from the screw 15, or actually from the outlet passage 30, is under the control of a vertically reciprocable valve 50 illustrated in two different operative positions in FIGURES 2 and 5.

Interposed between the outlet passage 30 and the passage 32 of the orifice block 31 is a vertical, cylindrical valve passage 51. This passage interconnects the passages 30 and 32 and is formed as the part of a vertical bore in a block 52 secured, as by screws 53, to the front or discharge end of the plasticizer barrel 25 and secured by suitable means (not shown) to a vertical side surface of the orifice block 31. This vertical bore includes a first portion 54 lying above the passage 51 and a second portion 55 lying below the passage 51. The upper end of the passage portion 54 is closed by a closure plate 56 secured thereto by sutiable means, as by screws 57.

The valve body 50 is vertically actuated by means of a fluid pressure cylinder 58 (FIGURE 1), the valve body forming the piston rod of this cylinder. The lower portion 59 of the valve body 50 is cylindrical in configuration and snugly fits within the lower portion 55 of the valve bore, and the medial portion 60 of the valve body 50 is of reduced diameter and is joined to the lower portion 59 by means of a conical joining portion 61. A second conical joining portion 62 joins the portion 60 to an upper cylindrical portion 63 snugly fitting into the upper portion 54 of the valve bore.

When the valve 50 is positioned in its upper position of FIGURE 2, the lower cylindrical portion 59 is entered into the valve passage 51 to prevent the flow of plasticized material from the passage 30 into the passage 32. When the valve body 50 is in its lowered position of FIGURE 5, the reduced portion 60 thereof is in the valve passage 50 and the passages 30 and 32 are interconnected by means of the valve passage 51.

The specific double chamfered valve body 50 is of a design such that it is always balanced against the pressure exerted by the plasticized material, and no resistance of the material need be overcome by the valve as it is actuated to either of its illustrated positions of FIGURES 2 and 5. Further, the valve body 50 to either side of the effective medial portions 60 thereof snugly fits within the cylindrical bore portions 54 and 55, so that there is no leakage of plasticized material beyond the valve.

*Plasticizer Screw and Barrel Structure*

As best illustrated in FIGURES 2 through 8, the plasticizer screw 15 and the plasticizer barrel 25 are of specific configuration. This configuration of the screw and the barrel yields the structural and functional advantages of the present invention and shall be described in detail as follows:

The plasticizer screw 15 is provided with a helical, peripherally extending land 70 having flattened exterior thread surfaces 71 (FIGURE 4) snugly abutting the inner periphery 26 of the barrel 25. This land 70 defines between successive convolutions thereof flat-bottomed grooves 72.

The flat-bottomed grooves 72 are of decreasing depth toward the nose or discharge end 73 of the screw. In other words, the root diameter of the helical thread defined by the land 70 increases toward the forward end 73 of the screw. The extreme forward end of the screw is defined by a cylindrical surface 74 snugly mating with the bore 26 of the barrel 25 and defining an enlarged piston-like end face 75 for the screw.

This cylindrical extremity 76 of the screw is bored, as at 77, to receive therein a spherical ball check 78 which is entrapped within the bore 77 between radial inward projections 79 (FIGURE 6) and a conical ball seat 80 inclined inwardly and rearwardly toward the remainder of the screw and provided with a central aperture 81 which is of a radius substantially less than the radius of the ball check 78.

Rearwardly of the cylindrical enlargement 76 at the extremity of the screw 15, a plurality of radial passages 82 (FIGURES 2 and 7) establish communication between the terminal screw groove 72 and the bore 77 through the check valve passage 81.

Additionally, the forward end of the screw 15 is provided with an axially extending recess 85 opening onto the ball check passage 77 at one end and communicating at its other end with a portion of the screw land 70 by means of a radial passage 86 (FIGURES 2, 3 and 4). It will be noted from FIGURE 4 that that portion of the land 70 with which the passage 86 registers is slightly enlarged peripherally of the screw, as at 87, to provide sufficient material for the opening 86.

As best illustrated in FIGURE 1 of the drawings, the barrel 25 is circumscribed by electrical resistance heating elements 25a in the conventional manner to aid in the plasticizing action of the screw 15. From FIGURES 2, 3 and 4, it will also be seen that the bore 26 of the barrel 25 is locally enlarged, or recessed, as at 90.

From a comparison of FIGURES 2 and 5, it will be seen that the venting of the recess 85 to the periphery of the screw 15 at the land 70 by the port 86 prevents any flow of plasticized material outwardly to the periphery of the screw at any time when the port 86 does not register with the recess 90. Conversely, when the port 86 does register with the enlargement 90 in the barrel, plasticized material can flow through the recess 85 and the port 86 into the recess 90 to the periphery of the screw.

Such material vented through the periphery of the screw will, of course, be advanced by the helical configuration of the screw as the screw is rotated. Thus, material delivered by the screw to the forward end 73 thereof will pass through the radial ports 82 to the recess 85, through the recess 85 and radially outwardly through the port 86 into the barrel recess 90 for recirculation back to the forward end of the screw.

Therefore, it will be readily appreciated that the recess 85 and the port 86 provide for the recirculation of plasticized material from the forward end of the screw to a medial portion of the screw whenever the screw is axially located at a predetermined position within the barrel bore 26, i.e. with the port 86 in registry with the barrel recess 90. When the screw is not so located, recirculation will not occur.

*Operation*

With the device in the condition illustrated in FIGURE 1 of the drawings, it will be noted that the screw 15 is in its rearmost position at which the piston 17 is fully retracted in its cylinder 18. The mechanism 14 continuously rotates the screw 15, and the valve 50 is in its closed position of FIGURE 2 of the drawings. The neck mold 39 is in its lowered position directly overlying the orifice 38, as indicated in FIGURE 5 of the drawings, and the blow mold sections 43 are in their open positions of FIGURE 1.

The device is actuated in response to a predetermined signal, such as an impulse from a timer or the like, to introduce fluid under pressure through the conduit 19 into the cylinder 18. Such fluid under pressure will advance the piston 17 to displace the screw 15 forwardly. At the same time, the valve cylinder 58 is actuated to move the valve body 50 to its position of FIGURE 5, thereby establishing communication between the passages 30 and 32.

The forward displacement of the piston will displace plasticized material previously accumulated in advance of the forward piston face 75 of the screw 15, such material being displaced through the passage 30 about the valve reduced portion 60 and through the valve passage 51 into the chamber 32. The material subsequently will be displaced through the material passage 35 and from the orifice 38 into the overlying mold cavity 40.

When sufficient material has entered the mold cavity 40, the screw 15 will have been advanced to an extent sufficient to actuate the limit switch LS1. This limit switch LS1 shuts off the supply of fluid under pressure through the conduit 19 into the cylinder 18 and actuates the cylinder 58 to close the valve 50, i.e. to move the valve body to its position of FIGURE 2. Of course, during the prior forward movement of the screw 15, the plasticized material in advance of the screw and within the barrel bore 26 will have been subjected to pressure due to displacement of the screw. This pressure will seat the ball check 78 against its conical seat 80, so that the closed ball check 78, in combination with the end face 75 of the screw, presents an uninterrupted or solid piston face to displace the plasticized material as above explained without allowing any back flow of material along the flights of the screw.

Closure of the valve body 50 to its position illustrated in FIGURE 2 of the drawings will isolate from the orifice 38 that plasticized material remaining within the barrel bore 26 in advance of the screw. However, the screw continues to rotate, being continuously driven by the mechanism 14, and this material remaining ahead of the screw will be supplemented by additional material advanced by the screw lands 70 and passing through the radial ports 82 into the bore 77. As a result, the ball check 78 will be displaced forwardly, i.e. to its position of FIGURE 2, and plasticized material can flow from the periphery of the screw through the valve port 81 and about the ball check 78 for addition to material previously located ahead of the screw.

This flow of material under pressure will force the screw rearwardly within the barrel bore 26 and against back pressure on the piston 17, until such time that the screw travels backwardly to such an extent that the passage 86 comes into registry with the barrel bore recess 90. When such registration is obtained, an alternate flow path for material leaving the exit end 73 of the screw is available. Subsequently issued material will flow through the radial ports 82, the screw axial recess 85 and the radial port 86 into the barrel recess 90 to be re-advanced by the rotating screw land 70 toward the exit end 73 of the screw.

This recirculation will be obtained under a pressure equivalent to the pressure exerted upon the accumulated material trapped between the closed valve element 50 and the forward or piston face 75 of the screw 15. If the pressure of accumulated material drops below the pressure of material passing through the port 82 and the recess 85, then the ball check 78 will be moved to its position of FIGURE 2 and material will flow from the exit end 73 of the screw to join the accumulated material. Conversely, if the pressure of accumulated material in advance of the screw exceeds that of material in the recess 85, such pressure will force the ball check 78 against its seat 80, and all of the material exiting from the forward end 73 of the screw will pass into the recess 85 for recirculation through the radial port 86 and the barrel groove 90. Thus, a substantially constant pressure of accumulated material is obtained.

After the elapse of a period of time sufficient to insure the setting of plasticized material within the neck mold cavity 40, a second timer impulse will again vent the cylinder 18 to fluid under pressure through the conduit 19. Substantially simultaneously therewith, the valve body 50 will be retracted to its open position of FIGURE 5 by actuation of the cylinder 58. Thus, the movement of the screw 15 forwardly will again displace the previously accumulated material through the passage 30, the valve passage 51, the orifice passage 32 and the orifice 38 to extrude the tube 45 integral with material filling the injection mold cavity 40, as best illustrated in FIGURE 8.

During such advancement of the screw 15, the port 86 will be moved from registry with the barrel recess 90, any recirculation of material internally of the screw will be interrupted, and the ball check valve 78 will be moved against its seat 80, so that the cylindrical end 76 and the ball check 78 again present, in effect, a solid piston face to displace the accumulated material through the orifice 38.

After extrusion of the tube 45 to a desired length, the limit switch LS2 is actuated (the limit switch LS1 being unactuated during the second contact therewith by the abutment 21), the valve body 50 is again actuated to its closed position of FIGURE 2, and the cylinder 58 is again vented to back pressure. Substantially simultaneously therewith, the blow mold segments 43 are closed upon the extruded tube 45 and the tube is blown to its final article configuration. Once again, continued rotation of the screw displaces material through the radial ports 82 and the ball check bore 77 past the ball check 78 into the accumulation space intermediate the closed valve body 50 and the forward face 75 of the screw. As such material under pressure is accumulated, the screw 15 is displaced rearwardly, this accumulation of material and progressive rearward movement of the screw 15 continuing until such time as the port 86 comes into registry with the barrel bore recess 90. When such registration is accomplished, recirculation again occurs in a manner heretofore described, and such recirculation continues until such time as a subsequent cycle is reinitiated.

From the foregoing description, it will be readily appreciated that the present invention provides a new and novel apparatus for and method of plasticizing and dispensing plastic materials, particularly thermoplastic materials. The novel piston end 76 and ball check 78 arrangement presents a substantially solid piston front for the screw 15 to accurately and fully express the accumulated plasticized material as the screw is forwardly displaced. Since there is no communication between the accumulated material and the helical screw flights, there can be no back pressure or leakage of plasticized material along the screw threads, and no material is lost by any such back flow as the screw is advanced in its pressure stroke.

Additionally, the provision of the axial recess 85 and the radial port 86 in combination with the barrel groove or recess 90 provides a means for recirculating plasticized material without any extraneous mechanism for accommodating, initiating or interrupting recirculation. The provision of the radial passage 86 communicating with the land 87 insures sealing off of the recirculation recess 85 at all times, except when the plasticized material desired is fully accumulated and the screw is in the predetermined position at which recirculation is desired.

Further, utilization of the ball check valve 78 in combination with the recess 85 insures maintenance of the previously accumulated material at a pressure equal to the normal discharge pressure of the screw 15.

Under actual operating conditions, it has been found that recirculation can be accomplished at a constant pressure of 3600 pounds per square inch and the previously accumulated material is also maintained at this pressure. Upon displacement of the screw through its dispensing strokes, a dispensing pressure of 4700 pounds per square inch can be readily attained. During return of the screw from its forwardmost or dispensing position to its rearmost or recircultaing position, a constant pressure of 2800 pounds per square inch can be readily maintained. The recirculation pressure of 3600 pounds per square inch can be maintained accurately with a maximum fluctuation of plus or minus fifty pounds per square inch.

I claim:

1. In a plasticizing apparatus wherein a continuously rotatable plasticizer screw having a peripheral helical land and groove configuration is intermittently axially displaced in a peripheral barrel (1) from a first position toward a dispensing orifice to express plasticized material therethrough and (2) away from the orifice toward said first position to accumulate later-expressed material, the improvements of means accommodating recirculation of plasticized material only at said first position and including an axial recess in said screw communicating at one end with the screw groove at the discharge end thereof and communicating at the other end through a port opening onto the screw land in spaced relation to the screw discharge end, and a peripheral groove in said barrel aligned with said port only when said screw is in its first position.

2. In a method of expressing plastic material through a discharge opening by means of a continuously rotating plasticizing screw axially displaceable in a barrel towards and away from said opening, the steps of interrupting communication between said barrel and said opening, displacing the screw away from said opening to accumulate a body of material between the screw and the opening, axially halting the screw at a first position, flowing material from the discharge end of the screw interiorly of the screw for passage alternatively to (1) said accumulated body of material and (2) the screw periphery medially of the screw length dependent solely upon the resistance of material flow, and displacing the screw toward the opening to (1) prevent flow from the discharge end of the screw to the screw periphery and (2) to discharge accumulated material from said body through the opening.

3. A plastic dispensing apparatus comprising a plasticizer barrel having a cylindrical bore therein communicating at one end with a mold passage and at the other end thereof with a source of thermoplastic material, a plasticizing screw in said barrel bore and having a continuous helical land peripherally snugly fitting in said bore to advance material in a complementary groove from said source toward said mold, said screw having a cylindrical end portion snugly fitting in said bore, an axial passage in said screw, a one-way check valve carried by said screw and located in said passage portion to be encompassed by said cylindrical end portion, radial ports establishing communication between spaced portions of the screw periphery and said passage, means for rotationally and axially displacing said screw, and means accommodating the flow of material through said passage only at one axial position of said screw.

4. In a plasticizing apparatus having a plasticizer screw rotatable in an enclosing barrel, the screw being axially displaceable in a first direction from a first position to dispense plasticized material and in a second direction to said first position to accumulate later-dispensed material, the improvements of an axial passage in said screw communicating at one end with the discharge end thereof and having a radial port at the other end communicating with the screw periphery in spaced relation to the screw discharge end, and a peripheral groove in said barrel aligned with said port only when said screw is in its first position, so that plasticized material discharged from the screw flows through said passage for discharge onto the screw periphery.

5. A plastic dispensing apparatus comprising a plasticizer barrel having a cylindrical bore therein communicating at one end with a mold passage and at the other end thereof with a source of thermoplastic material, a plasticizing screw in said barrel bore and having a continuous helical land peripherally snugly fitting in said bore to advance material in the complementary groove from said source toward said mold, said land terminating in spaced relation to the mold-adjacent end of said screw to define a cylindrical end portion snugly fitting in said bore and having an end face, an axial recess in said screw communicating at one end with said screw land through a radial port and at its other end with said screw groove closely adjacent said end portion, said end portion being axially bored to establish communication between the screw groove and the screw recess and the end face of the end portion, a one-way check valve in said end portion bore accommodating free groove-to-end face communication and normally preventing end face-to-recess communication, means for rotationally and axially displacing said screw, and a peripheral groove in said barrel bore registrable with said radial port in said land when said screw is in an axially adjusted position.

6. In a method of expressing plastic material through a discharge opening by means of a continuously rotating plasticizing screw intermittently axially displaceable in a barrel towards and away from said opening, the steps of accumulating a body of material between the screw and the opening, the screw being located in the barrel at a first position when said body of material has been accumulated, directing additional material from the discharge end of the screw alternatively to said body and through a recirculation path interiorly of the screw to the screw periphery medially of the screw length dependent upon the pressure of said accumulated body, and subsequently displacing the screw from said first position toward the opening to (1) prevent the flow of material through said recirculation path and (2) to discharge accumulated material through the opening.

7. In a plasticizing apparatus wherein a continuously rotatable plasticizer screw having a peripheral helical land and groove configuration is intermittently axially displaced in an enclosing barrel (1) toward a dispensing orifice to express plasticized material therethrough and (2) away from the orifice to accumulate later-expressed material intermediate the screw and the orifice, the improvements of means accommodating recirculation of plasticized material intermediate dispensing and accumulating displacement of the screw and including an axial recess in said screw communicating at one end with the screw groove at the discharge end thereof and communicating at the other end with a port opening onto the screw land in spaced relation to the screw discharge end, and a peripheral groove in said barrel aligned with said port only when said screw is in its furthest position away from the orifice, so that plasticized material discharged from the screw flows into said recess and thorugh said port back onto the screw periphery.

8. In a method of expressing plastic material through a discharge opening by means of a continuously rotating plasticizing screw axially displaceable in a barrel towards and away from said opening, the steps of
(1) isolating said barrel from said opening;
(2) progressively accumulating a body of plasticized material in said barrel in advance of said screw, the screw being correspondingly displaced from said opening as said body of material accumulates;
(3) simultaneously (a) halting said screw in a first axial position and (b) recirculating material from said screw as the screw continues to rotate and said body of material is maintained constant;
(4) substantially simultaneously (a) establishing communication between said barrel and said opening, (b) displacing said screw from said first position toward said opening, and (c) interrupting recirculation to displace at least a portion of said accumulated body of material through said opening, and
(5) re-establishing recirculation only after the performance of steps (1) and (2) above and only after said screw reassumes its said first axial position.

9. In an apparatus for dispensing plasticized material through an orifice, a plasticizer comprising a cylindrical barrel, a screw having a threaded periphery and being movable axially and rotationally in said barrel, means for rotating said screw, means for axially displacing said screw toward said orifice, said screw having a cylindrical end portion interposed between the threaded periphery thereof and said orifice, said end portion having an axial passage therein communicating through radial ports with the threaded periphery of said screw and a valve seat interposed between said passage and said radial ports, and a check valve disposed in said passage and cooperable with said seat to accommodate the flow of plasticized material from said threaded periphery of the screw through said ports and said passage, but preventing the reverse flow of plasticized material as the screw is axially displaced toward the orifice.

References Cited in the file of this patent
UNITED STATES PATENTS 2,668,986    Miler _____ Feb. 16, 1954
2,944,288    Sherman _____ July 12, 1960